(12) United States Patent
Lee et al.

(10) Patent No.: US 8,411,041 B2
(45) Date of Patent: Apr. 2, 2013

(54) TOUCH EVENT-DRIVEN DISPLAY CONTROL SYSTEM AND METHOD FOR TOUCHSCREEN MOBILE PHONE

(75) Inventors: Heui Jin Lee, Gumi-si (KR); Jung Min Kim, Gumi-si (KR); Kyung Ho Oh, Gumi-si (KR); Jong Han Beock, Gumi-si (KR)

(73) Assignee: Samsung Electronics co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 834 days.

(21) Appl. No.: 12/070,107

(22) Filed: Feb. 15, 2008

(65) Prior Publication Data

US 2008/0198141 A1   Aug. 21, 2008

(30) Foreign Application Priority Data

Feb. 15, 2007   (KR) .................. 10-2007-0016235

(51) Int. Cl.
*G06F 3/041* (2006.01)
(52) U.S. Cl. ..................................... 345/173
(58) Field of Classification Search ............... 345/173; 715/702, 863, 788–801
See application file for complete search history.

(56) References Cited

U.S. PATENT DOCUMENTS

| | | | |
|---|---|---|---|
| 2002/0030668 A1 | 3/2002 | Hoshino et al. | |
| 2005/0035951 A1 | 2/2005 | Bjorkengren | |
| 2006/0152497 A1* | 7/2006 | Rekimoto | 345/173 |
| 2006/0252442 A1 | 11/2006 | Nurmi | |
| 2008/0036743 A1* | 2/2008 | Westerman et al. | 345/173 |
| 2008/0163104 A1* | 7/2008 | Haug | 715/788 |

FOREIGN PATENT DOCUMENTS

| | | |
|---|---|---|
| EP | 1517228 | 3/2005 |
| KR | 2006-11515 | 2/2006 |
| KR | 20-0429347 | 10/2006 |
| KR | 2006-131152 | 12/2006 |
| WO | 2006/020304 | 2/2006 |
| WO | WO 2006020304 A2 * | 2/2006 |

* cited by examiner

*Primary Examiner* — Amare Mengistu
*Assistant Examiner* — Jennifer Zubajlo
(74) *Attorney, Agent, or Firm* — Cha & Reiter, LLC (57) ABSTRACT

A touch event-driven display control system and method for a touchscreen mobile phone is provided to control the information display by onscreen touch manipulation. An information display method for a touchscreen-enabled device according to the present invention includes detecting a touch on an information region of a touchscreen, determining a type of the touch and processing display of information item according to the type of touch.

26 Claims, 9 Drawing Sheets

TOUCH EVENT-DRIVEN DISPLAY CONTROL SYSTEM AND METHOD FOR TOUCHSCREEN MOBILE PHONE

CLAIM OF PRIORITY

This application claims the benefit of the earlier filing date, pursuant to 35 USC 119(e), to that patent application entitled "TOUCH EVENT-DRIVEN DISPLAY CONTROL SYSTEM AND METHOD FOR TOUCHSCREEN MOBILE PHONE," filed in the Korean Intellectual Property Office on Feb. 15, 2007 and assigned Serial No. 2007-0016235, the contents of which are incorporated herein by reference.

BACKGROUND OF THE INVENTION

1. Field of the Invention

The present invention relates to a graphic user interfaces in mobile phone and, in particular, to a touch event-driven display control system and method capable of controlling information display by onscreen touch manipulation.

2. Description of the Related Art

With the advance of information processing and semiconductor technologies, mobile phones are becoming very powerful and dominant devices for mobile computing. Recently, the mobile phones are evolving into mobile multifunction terminals with the incorporation of various useful functions such as multimedia playback, wireless Internet access, short range wireless communication, mobile broadcast receiver etc., in addition to the conventional voice communication and text messaging functions. Along with the multifunctional trend, the display device also has been developed in terms of size, design, and resolution as a user interface of the mobile phone.

As one of the advanced display devices, a touchscreen is often used to assist the mobile phone. The touchscreen has the ability to display and receive information on the same screen. Thus, the conventional keypad as an input device can be replaced by the touchscreen. The mobile phone equipped with the touchscreen is advantageous in screen size and intuitive manipulation. For this reason, portable device manufactures are mostly interested in development of touchscreen enabled devices. However, touchscreen enbabled devices require a method to provide manipulation convenience of the data displayed.

SUMMARY OF THE INVENTION

The present invention provides a touch event-driven display control system and a method that is capable of controlling onscreen data display according to a touch event.

The present invention also provides a touch event-driven display control system and a method that is capable of controlling behaviors of onscreen objects presented on a standby screen in response to touch events.

The present invention also provides a touch event-driven display control system and a method that allow a user to intuitively manipulate behaviors of onscreen objects presented on a standby screen with predetermined touch events.

In accordance with an aspect of the present invention, an information display method for a touchscreen-enabled device includes detecting a touch on an information region of a touchscreen, determining a type of the touch and processing display of information item according to the type of touch.

In accordance with another aspect of the present invention, an information display method for a touchscreen-enabled mobile device includes displaying a standby mode screen having an information region presenting an information item set by a user, detecting a touch event on the information region; extracting a direction and indication value of the touch, determining a next information item on the basis of the direction and indication value of the touch event and replacing the information item with the new information item in the information region.

In accordance with another aspect of the present invention, an information display method for a touchscreen-based mobile device includes displaying a first information item in a first region of the touchscreen and an icon representing an application in a second region of the touchscreen, detecting a touch event on the touchscreen, moving and/or changing, if the touch event is a flick event on the first information item, the first information item depending on a direction of the flick event; and displaying, if the touch event is a tap event on the icon, a second information item provided by the application.

In accordance with another aspect of the present invention, a mobile device includes a display panel for displaying a graphic user interface, a touchscreen covered the display panel for detecting a touch event that occurs on the display panel and a controller for controlling display of information items on the basis of the touch events.

BRIEF DESCRIPTION OF THE DRAWINGS

The above features and advantages of the present invention will be more apparent from the following detailed description in conjunction with the accompanying drawings, in which.

DETAILED DESCRIPTION

Embodiments of the present invention are described with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Certain terms are used in the following description for convenience and reference only and are not limited. In the following detailed descriptions, only the exemplary embodiments of the invention have been shown and described, simply by way of illustration of the best mode contemplated by the inventors of carrying out the invention. As will be realized, the invention is capable of modification in various obvious respects, all without departing from the invention. Accordingly, the drawings and descriptions are to be regarded as illustrative in nature and not restrictive.

The present invention pertains to a method and system for controlling display behaviors such as screen change and object movement in response to touch event detected by the touchscreen.

The touch event-driven display control system and method allow executing an operation in response to a touch event for selecting an object presented on the touchscreen. Since user-intended information is displayed by an intuitive touch event, the usability of screen, particularity, a standby screen increases.

In this embodiment, the mobile phone is implemented with a touchscreen display providing various mode screens such as standby screen, image viewer screen, and motion picture play screen.

In one embodiment of the present invention, a touch event-driven control system and method allow a user to check information through intuitive touch event associated with the presentation of the target information without closing ongoing screen(s).

In one embodiment of the present invention, the touch events are classified into a tap event and a flick event. The tap event is detected when the user taps a finger or contact device such as stylus pen on the touchscreen. The flick event is detected when the user flicks the touchscreen with a finger or stylus pen. In one embodiment of the present invention, the flick event is configured to change information on a specific area of the touchscreen or move an object. That is, the flick event implies a selection of an object (or information) and moves the selected object in the flicking direction. That is, the flick event causes the object to behave as if it is thrown off toward the flicking direction through inertia. When an object is flicked out of the display area, a new object appears on the touchscreen. Also, when the object is flicked out in the display area, the object is moved and presented at a new position.

In the following, the touch event-driven display control system and method of the present invention are described with regard to a mobile phone. However, the present invention is not limited thereto. For example, the touch event-driven display control system and method can be applied to other electric devices such as laptop computer, Personal Digital Assistant (PDA), Smartphone, multimedia player, MP3 player, digital broadcast receiver, and the like. Also, the mobile phone can be any of Code Division Multiple Access (CDMA) terminal, Wideband CDMA (WCDMA) terminals, and Global System for Mobile Communication (GSM) terminals, General Packet Radio System (GPRS) terminals.

The touchscreen can be installed so as to occupy partial or the entire area of one surface of the mobile phone. The mobile phone may be provided with at least one of a keypad, a pointing device, and auxiliary function buttons.

Figure 1:
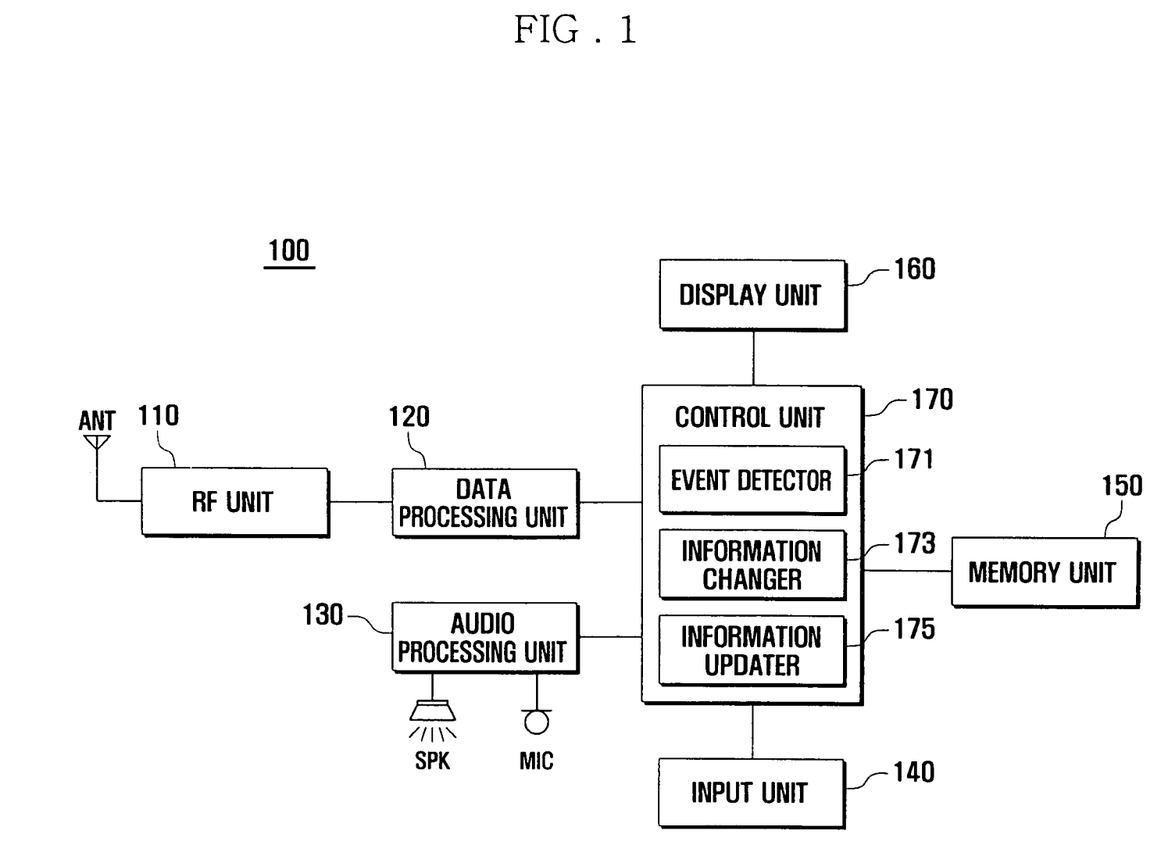
FIG. 1 is a block diagram illustrating a configuration of a mobile phone equipped with a touch event-driven display control system according to an exemplary embodiment of the present invention.

FIG. 1 is a block diagram illustrating a configuration of a mobile phone equipped with a touch event-driven display control system according to an exemplary embodiment of the present invention.

Referring to FIG. 1, the mobile phone 100 includes a radio frequency (RF) unit 110, a data processing unit 120, an audio processing unit 130, an input unit 140, a memory unit 150, a display unit 160, and a control unit 170. The control unit 170 includes an event detector 171, an information changer 173, and an information updater 175.

The RF unit 110 is responsible for radio communication of the mobile phone 100. The RF unit 110 establishes a radio channel with a radio access network, e.g., a base station, for voice and data communications in a mobile communication network. The RF unit 110 includes an RF transmitter for amplifying and up-converting transmission signals and an RF receiver for low noise-amplifying and down-converting reception signals.

The data processing unit 120 is responsible for processing voice data received from the audio processing unit 130, alphanumeric data input through the input unit 140, and radio data received or to be transmitted through the RF unit 110. The data processing unit 120 includes a transmission part for encoding and modulating signals to be transmitted through the RF unit 110 and a reception part for demodulating and decoding signals output by the RF unit 110. The data processing unit 120 may include a modem and a codec. The codec includes at least one of audio, video, and data codecs.

The audio processing unit 130 is responsible for processing audio data output by the data processing unit 120 to be output through a speaker (SPK) in the form of audible sound and processing the audio signal input through a microphone (MIC) to be output to the data processing unit 120.

The input unit 140 allows inputting alphanumeric data and function execution commands and transfers the input sequence to the control unit 170. The input unit 140 is configured to receive a voice dial mode activation/deactivation signal. The input unit 140 can be implemented with at least one of a normal keypad, a QWERTY keypad, and touchpad depending on the mobile phone. The input unit 140 may be provided with navigation keys, volume key, and various hot keys.

The memory unit 150 stores applications for executing the touch event-driven display control function of the mobile phone and user data generated while operating the application programs or input by the user.

The memory unit 150 also stores parameters associated with the touch event-driven display control method. The memory unit 150 may be provided with at least one buffer for temporarily storing the user data generated during the operations of the applications.

The display unit 160 is responsible for displaying the application data played during the operations of the application, key manipulation status, and enabled function information. The display unit 160 can be implemented with a Liquid Crystal Display (LCD). In this embodiment, the display unit 160 is implemented with a touchscreen LCD. Accordingly, the display unit 160 operates as a part of the input unit 140. The display unit 160 detects touch events and transmits signals corresponding to the touch events to the control unit 170. Particularly, the display unit 160 can detect and distinguish between tab and flick events and transmit control signals to the control unit 170 such that the control unit can control the information display on the basis of the control signals.

The display unit 160 is provided with a display layer for displaying the various application screens and a touchscreen layer laminated onto the display layer for detecting touch events applied thereon. The touchscreen layer can be formed on some part or the entire surface of the display layer.

The control unit 170 controls general operations of the mobile phone and cooperation of the internal elements. The control unit 170 controls signal flows among the data processing unit 120, audio processing unit 130, input unit 140, memory unit 150, and display unit 160. The control unit 170 may incorporate the data processing unit 120.

Particularly, the control unit 170 controls change of information displayed on the screen according to a control signal input through the touchscreen. The control signal is generated by a touch event, such as tapping or flicking on the touchscreen.

The control unit 170 also controls update of the information displayed on the screen in response to a touch event in real time. The display information includes text data, time information, calendar, text message, playlist, etc. The display information can be selectively presented according to a default setting or a user setting.

The display information can be provided with a recognition level for identifying the information and managed in the form of a mapping table. The mapping table is stored within the memory unit.

In order to control the interactive display operation, the control unit 170 includes an event detector 171, an information changer 173, and an information updater 175.

The event detector 171 can detect normal events occurring during operation of the mobile phone (for example, application execution event, call request event, key input event) and touch events occurred during the standby mode screen. The touch events can be classified into a flick event for which a user points a finger on an information item region of the touchscreen and flicks the finger and a tap event for which a user taps a finger, over the information item or object on the touchscreen.

The information changer 173 converts or moves the display information (or object) in response to the touch event detected on the touchscreen.

When an information change event (i.e. tap event) is detected, the information changer 173 checks the recognition level of the selected information or object and determines a movement direction on the basis of the recognition level. The information changer 173 extracts a recognition level of the movement direction and displays new information corresponding to the recognition level.

The information change event and information movement event can be represented by finger flicking or tap events over a specific information item on the touchscreen.

When the information change or movement event is detected, the information changer 173 determines the type of the event and processes the corresponding information item to be changed into another information item or moved to another place on the touchscreen. In this embodiment, the display information item is changed into previous item or next item according to the direction of the flick event. Also, the display information item moves in a flick direction.

The information item region is a touch-sensitive region such that a touch event occurs by tapping or flicking at the information item region. The information item region is formed on a touchscreen layer laminated on the display layer.

The display region is a region at which the information item is displayed. The display region can be configured for displaying information item such that the information item disappears after a predetermined time.

In a case that the display region is configured such that the information items can be changed and moved, the information item displayed on the display region can be changed or moved by tap and/or flick events.

The movement direction is determined by comparing displacements in left and right directions. Also, the movement direction can be determined by comparing displacements in upward and downward direction. The information item change or movement can be determined by comparing the displacement in the left/right direction and the upward/downward direction. The displacement is an absolute value regardless of increment and decrement rates. The movement direction is determined by the user's intention.

The information updater 175 updates the parameter(s) of the information in real time. The information updater 175 processes the information update on the basis of an update event associated with the information. The update event may be a time update event for updating the time application data or a calendar update event for updating the calendar application data. The update process can be performed with respect to at least one application.

The information can be consisted of various types of data such as time, date, day of the week, message, audio file, city name, etc.

Although the mobile phone 100 is schematically depicted in order to simplify the explanation on the touch event-driven display control system and method, the mobile phone 100 can be implemented further with at least one of a camera module, Bluetooth module, and digital broadcast receiver module.

The mobile phone can further include a vibration/tone generator for generating vibration or tone corresponding to a touch event. The vibration/tone generator is provided with a motor generating the vibration, a motor-driving module for generating motor control signal, and a tone generation module generating a tone.

The touch event-screen change and object movement operations of the above structured mobile phone are described hereinafter in more detail.

FIGS. 2A to 2E are screen images illustrating steps of screen change procedure of a touch event-driven display control system and method according to an exemplary embodiment of the present invention.

Referring to FIGS. 2A to 2E, a screen is provided with a first indicator region 210, a main display region 220, an information display region 230, and a second indicator region 240.

Figure 2A:
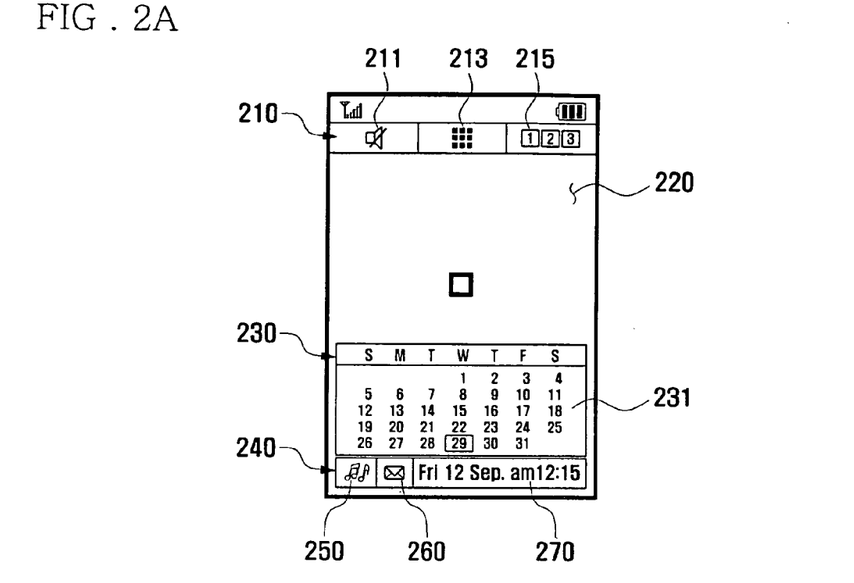
FIGS. 2A to 2E are screen images illustrating steps of screen change procedure of a touch event-driven display control system and method according to an exemplary embodiment of the present invention.
Figure 2B:
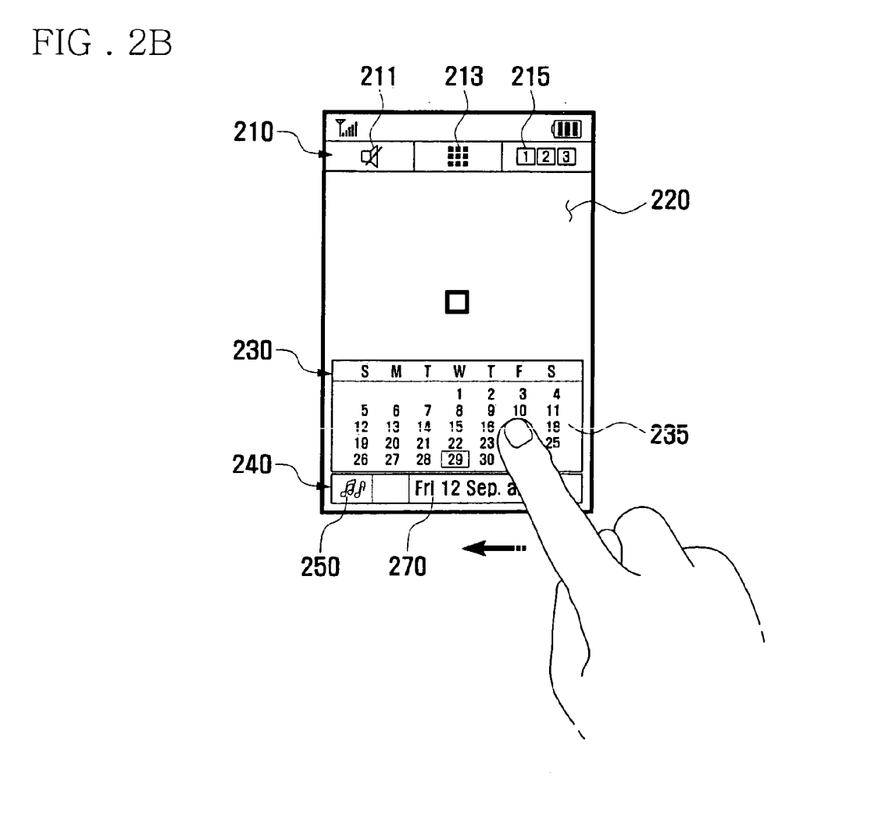

The first indicator region 210 presents icons representing applications that are activated by a touch event. Some default application icons are presented at the first indicator region 210. However, the first indicator region 210 can be set to present icons corresponding to the applications selected by the user. In FIG. 2A, the first indicator region 210 shows an incoming alert mode switching icon 211, a main menu icon 213, and a dialing icon 215.

The main display region 220 presents a mode screen registered for an operation mode. The mode screen can be presented in the form of a static or animated image.

The information region 230 is provided at a low part of the display screen in the form of an overlay window that presents information provided by an application set by default or selected by the user. The information region 230 can be configured to selectively display information provided by first type applications in the form of scrolling information windows and information of the second type applications that are activated by user selection.

In this embodiment, the first type applications include a calendar 235 a local time viewer 233, and the second type applications include a music player 255 and a message alerter 265.

When the local time viewer 233 is activated, the information region 230 shows local times of at least two cities. The cities can be registered by the user for the local time viewer application.

The second indicator region 240 shows at least one icon representing the second type application and a current time 270. For example, a music player icon is presented at the second indicator region 240 in FIG. 2C.

Figure 2C:
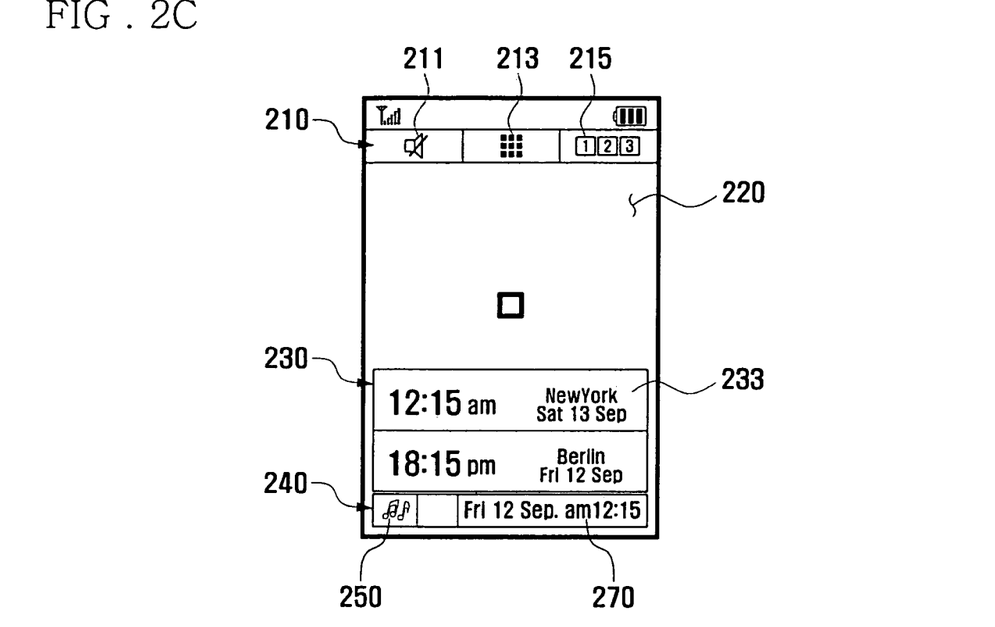
Figure 2D:
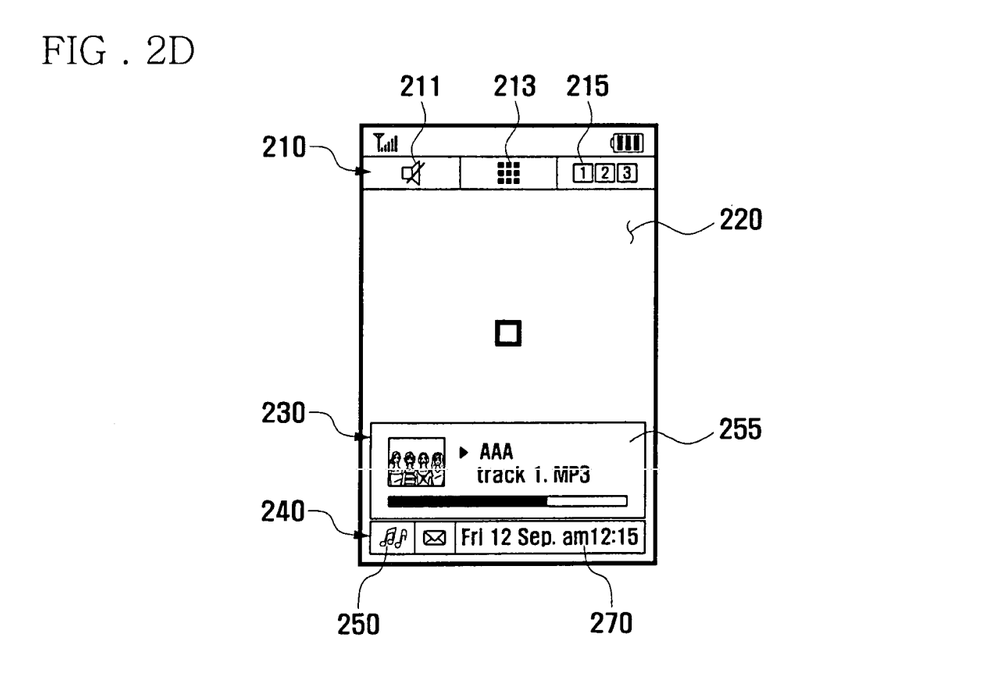
Figure 2E:
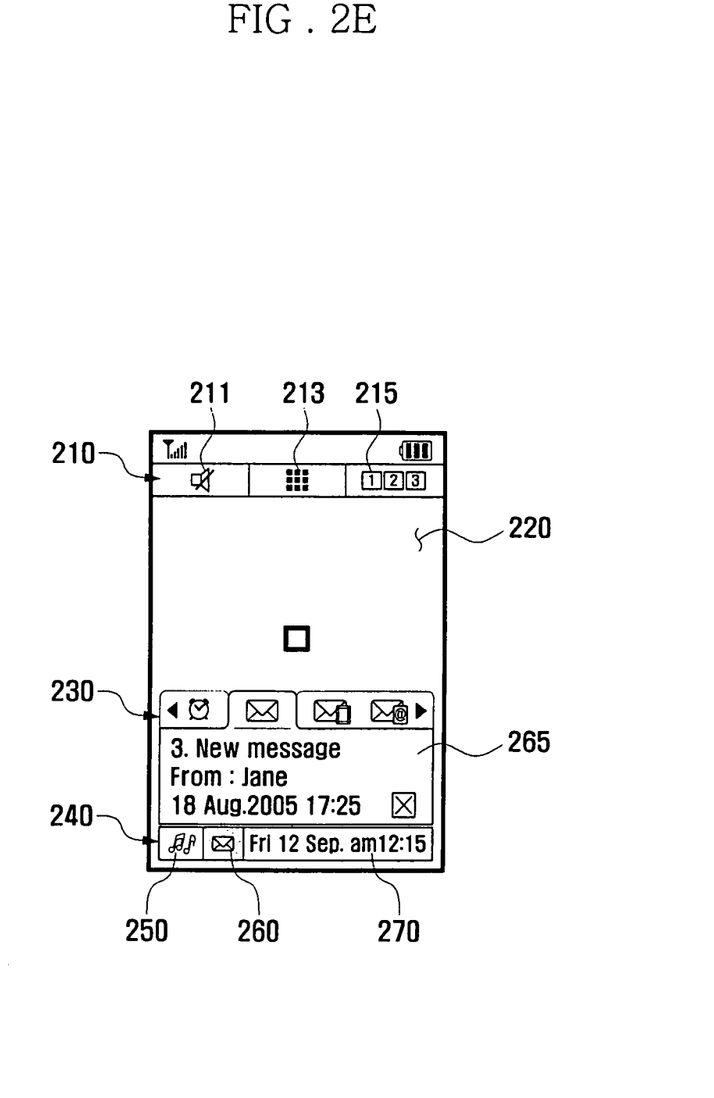

If a tap event is detected on the music player icon 250, the current playing music information is presented in the information region 230. Also, if a tap event is detected on the message alerter icon 260, newly received message alert is presented in the information region 230.

The current playing music information may include album title, song title, artist, etc. The music player application can be activated for playing background music. Also, the music player application can be activated together with at least one other application.

The message alerter 265 provides information on the new incoming messages. The message alert information may include a number of new messages, caller ID, and received time. If no new message is received, the message alerter icon preferably disappears. That is, the message alerter icon 260 appears when at least one new message is received.

The message alerter 265 can be configured to be shown with an icon indicating the message type such as Short Message Service (SMS) message, a Multimedia Messaging Service (MMS) message, and e-mail. This option can be set by the user.

Referring to FIGS. 2A to 2E, when the information region 230 is contacted by a finger, the information region is highlighted for indicating that the information region 230 is selected. When the flick event of the finger is detected in a direction, information windows (in this embodiment, a calendar window 231) scroll in the direction of the detected flicking such that the current information window (for example, the calendar window) disappears and a new application information window (for example, local time window 233) is presented in the information region 230. That is, the first type applications are arranged in a sequential order such that an application ordered before or after a currently activated application is activated in response to the direction of the flick. By flicking the finger in the left or right directions on the information region, the user can navigate the information windows of the first type applications such as calendar and local time applications.

The first type application that is presented in the information region 230 is determined by the flicking direction. The flicking direction is determined by comparing displacements in the left and right directions and selecting the direction in which the displacement is greater than that in the other direction. Also, the information region can be configured such that the application information windows are scrolling in upward and downward directions in the display screen according to the displacements of the flick event in upward and downward directions. In a case that the movement is detected in four directions, i.e. left, right, upward, and downward directions, the direction in which displacement is greater than those in other directions is determined as the scroll direction of the information windows. The displacement is expressed as an absolute value regardless of increment and decrement rates.

In the meantime, if one of the icons 250 and 260 presented at the second indicator region 240 is tapped, the information window 235 of the first type application (for example, the calendar) is replaced by a information window 255 of a second type application (for example, the music player) represented by the tapped icon is displayed in the information region 230. When a request to end displaying the information window of the second type application or a tap event is detected on the touchscreen, the second type application information window disappears, and the information window of a preset first type application or an application selected by the tap event is presented.

Figure 3:
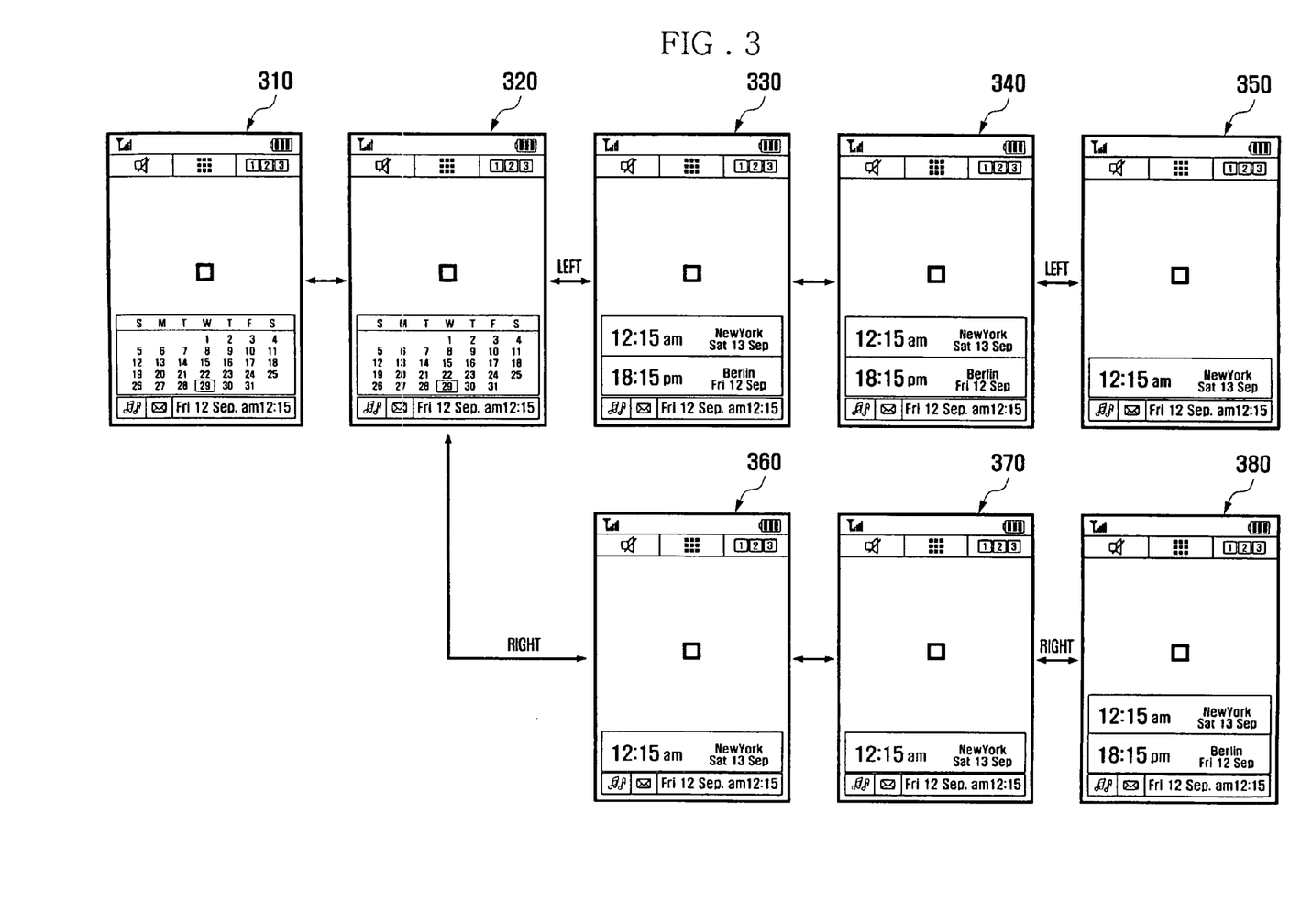
FIG. 3 is a diagram illustrating a flick event based-information window change procedure of a touch event-driven display control method according to an exemplary embodiment of the present invention.

FIG. 3 is a diagram illustrating a flick event based-information window change procedure of a touch event-driven display control method according to an exemplary embodiment of the present invention. Since the basic configuration of the display screen is identical with that of FIG. 2, the detailed description on the screen is omitted.

Before describing the processing shown in FIG. 3 in detail, it is assumed that the calendar application and local time application are set as the first type applications.

Referring to FIG. 3, if a touch event is detected on information region of the touchscreen while a standby mode screen is displayed (310), the information region is highlighted to indicate the selection of the information region (320). In the screen shots represented by the reference numerals 310 and 320, the information window of the calendar application is presented as one of the first type application.

If a left or right flick event is detected after the information region is highlighted, the control unit unloads the calendar application information window and loads the information window of the local time viewer application (330). If a touch is detected on the information region 230 while the local time viewer information window is loaded, the information region 230 is highlighted for indicating that the selection of the local time viewer information window is selected (340). If a left or right flick event is detected while the information region is highlighted, the control unit selectively presents one of the local times provided on the local time viewer information window (350).

If a left or right flick event is detected while displaying the local time viewer application information window, the control unit replaces the information window with the calendar application information window.

The information region 230 can be configured such that, if a flick event is detected when the three information windows are set for the information region 230 and the lowest level information is presented as described above, the highest level information window of a next second type application is presented.

The navigation over the second type application information windows can be performed in upward and downward directions in response to the upward and downward flick events.

In the meantime, if a touch is detected on the information region while the standby mode screen is presented (310), the information region 230 is highlighted to indicate the selection of the information region (320). In the screen shots represented by the reference numerals 310 and 320, the information window of the calendar application is presented as one of the first type application.

When a left or right flick event is detected after the information region is highlighted, the control unit replaces the calendar information window with the second time information window of the local time viewer application (360). The information region 230 can be configured such that, if a flick event is detected when the three information windows are set for information region 230 and the highest level information is presented, the lowest level information window of a next second type application is presented.

If a touch is detected on the information region of the touchscreen while presenting the second time information, the second time information is highlighted (370). When a right flick event is detected while the second time information window is highlighted, the control unit presents the first time information together with the second time information (380).

If a right flick event is detected again, the control unit activates the calendar application to present the calendar window in the information region 230. In this embodiment, the application windows navigation is explained in association with the right flick event. However, the application widow navigation can be achieved in left or right directions in association with the left or right flick events, respectively.

Although not explained above, the flick event can be detected in a diagonal direction. In this case, the information window is moved to a position and the information window navigation occurs in accordance with the flicking direction. That is, the information window movement and navigation can be processed at the same.

Figure 4:
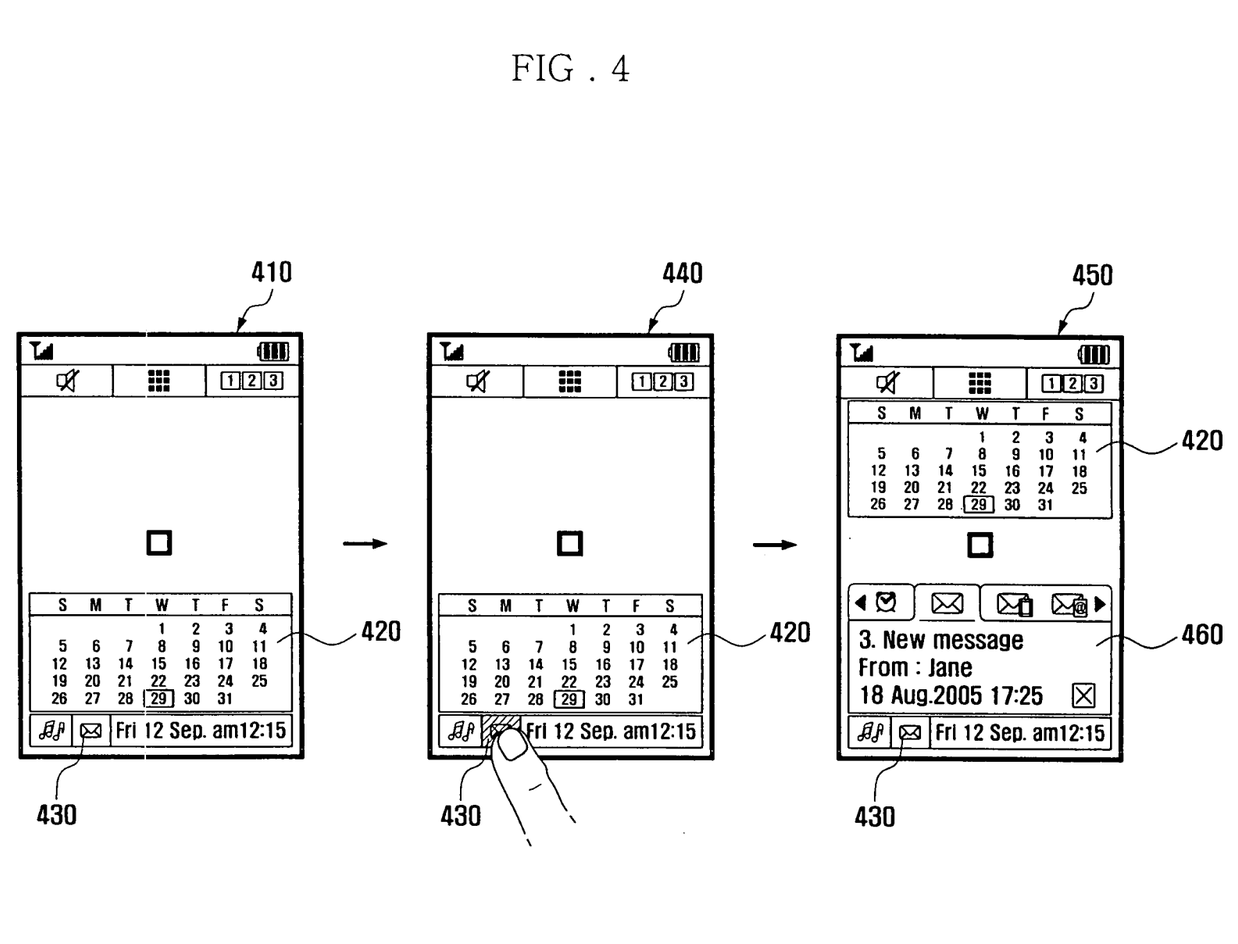
FIG. 4 is a diagram illustrating a tap event-based information window change procedure of a touch event-driven display control method according to an exemplary embodiment of the present invention.

FIG. 4 is a diagram illustrating a tap event-based information window change procedure of a touch event-driven display control method according to an exemplary embodiment of the present invention. Since the basic configuration of the display screen is identical with that of FIG. 2, a detailed description on the screen is omitted.

In this embodiment, the information window of the currently activated application is moved by a tap event and then replaced with another information window of a newly activated application by a flick event. Particularly, two application information windows are displayed simultaneously.

Referring to FIG. 4, if a tap event is detected on an icon 430 presented at the second indicator region while the standby mode screen is displayed (see screen shots 430 and 440), a first information window of the currently activated first application is moved to the upper part of the touchscreen right below the first indicator region, and a second information widow 440 of a second application represented by the icon 430 is displayed in the information region (see screen shot 450).

In this embodiment, at least two information windows of respective applications can be displayed simultaneously in such manner.

If a request for ending the presentation of the second information window or a flick event is detected while displaying the two information windows, the second information window disappears. In this case, the first information window may maintain its current position or return to be placed in the information region.

Also, if a left or right flick event is detected on the first information window while the first and second information windows are displayed simultaneously, the information presented in the first information window is changed into other application information. For example, the calendar window can be changed into a local time window as depicted in FIG. 3.

As shown in the screen shot represented by reference numeral 450, the first information window is displayed on the main display region 220 when two information windows are activated. In this case, the first window can be configured to automatically disappear after a predetermined presentation time. The movement of the information window and information change within the information window can be restricted in the main display region.

Also, first information window can be configured so as to move within the information window and change information presented therein. The utilization option of the main display region can be set by the user.

Figure 5:
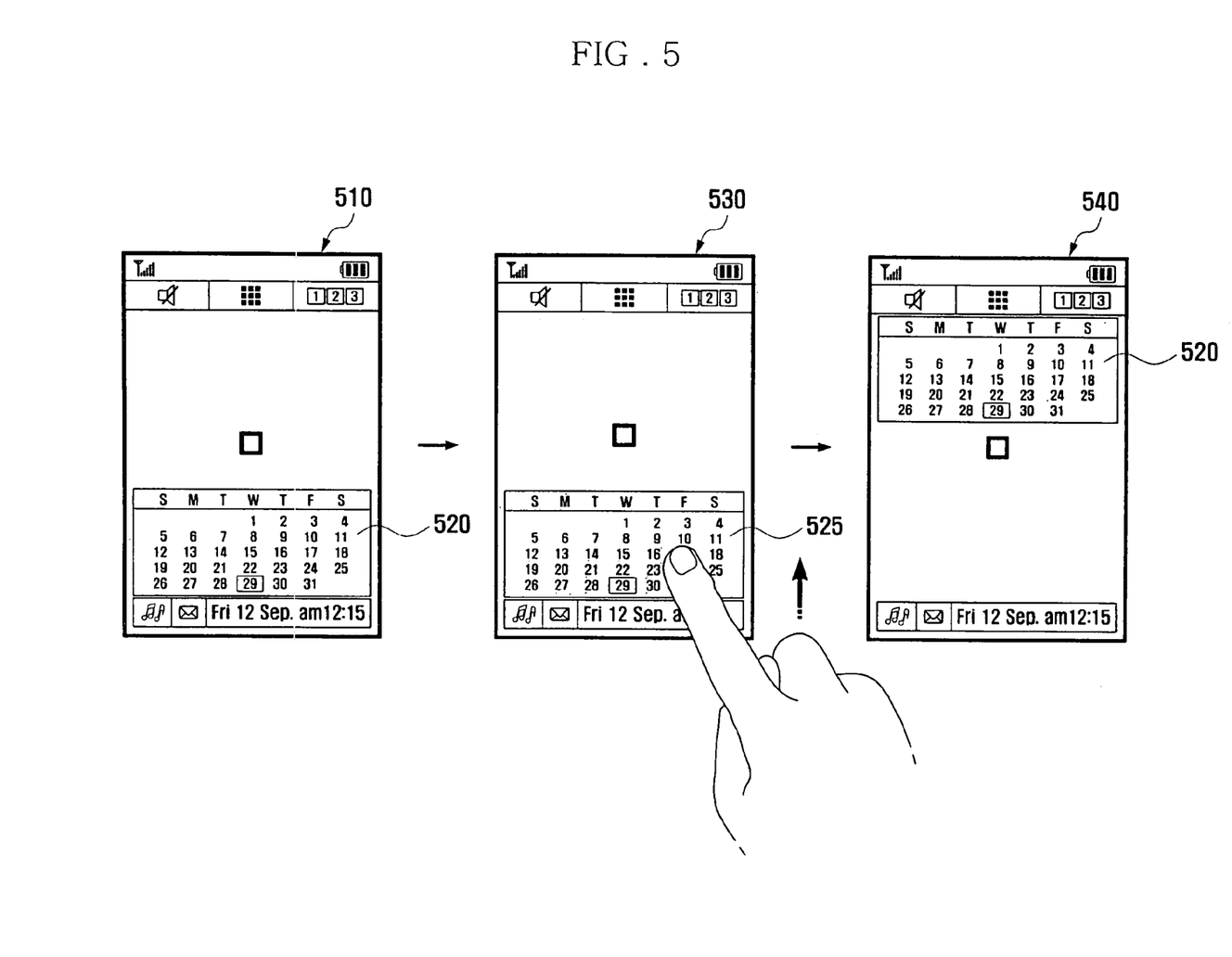
FIG. 5 is a diagram illustrating a flick event-based information window movement procedure of a touch event-driven display control method according to an exemplary embodiment of the present invention.

FIG. 5 is a diagram illustrating a flick event-based information window movement procedure of a touch event-driven display control method according to an exemplary embodiment of the present invention. Since the basic configuration of the display screen is identical with that of FIG. 2, the detailed description of the screen processing is omitted.

Referring to FIG. 5, when a touch is detected on the information region while an information window 520 (here, the calendar window) is displayed on the standby mode screen (see screen shot 510 and 530), the information window 520 is highlighted with a specific visual effect for indicating that the information window 520 is selected. If an upward flick event is detected on the highlighted information window 525, the information window moves upward to be position at an upper part of the screen (see 540).

In this embodiment, the information window can be moved up and down in the main display window according to the upward and downward flick events.

Also, if a left or right flick event is detected on the information window, the information presented in the information window is replaced by other information, as depicted in FIG. 3.

Also, the touchscreen can be configured to detect a diagonal flick events such that the information window moves upward/downward according to the up/down direction components of the diagonal flick event and changes the information presented therein in accordance with left/right direction components of the diagonal flick event.

Figure 6:
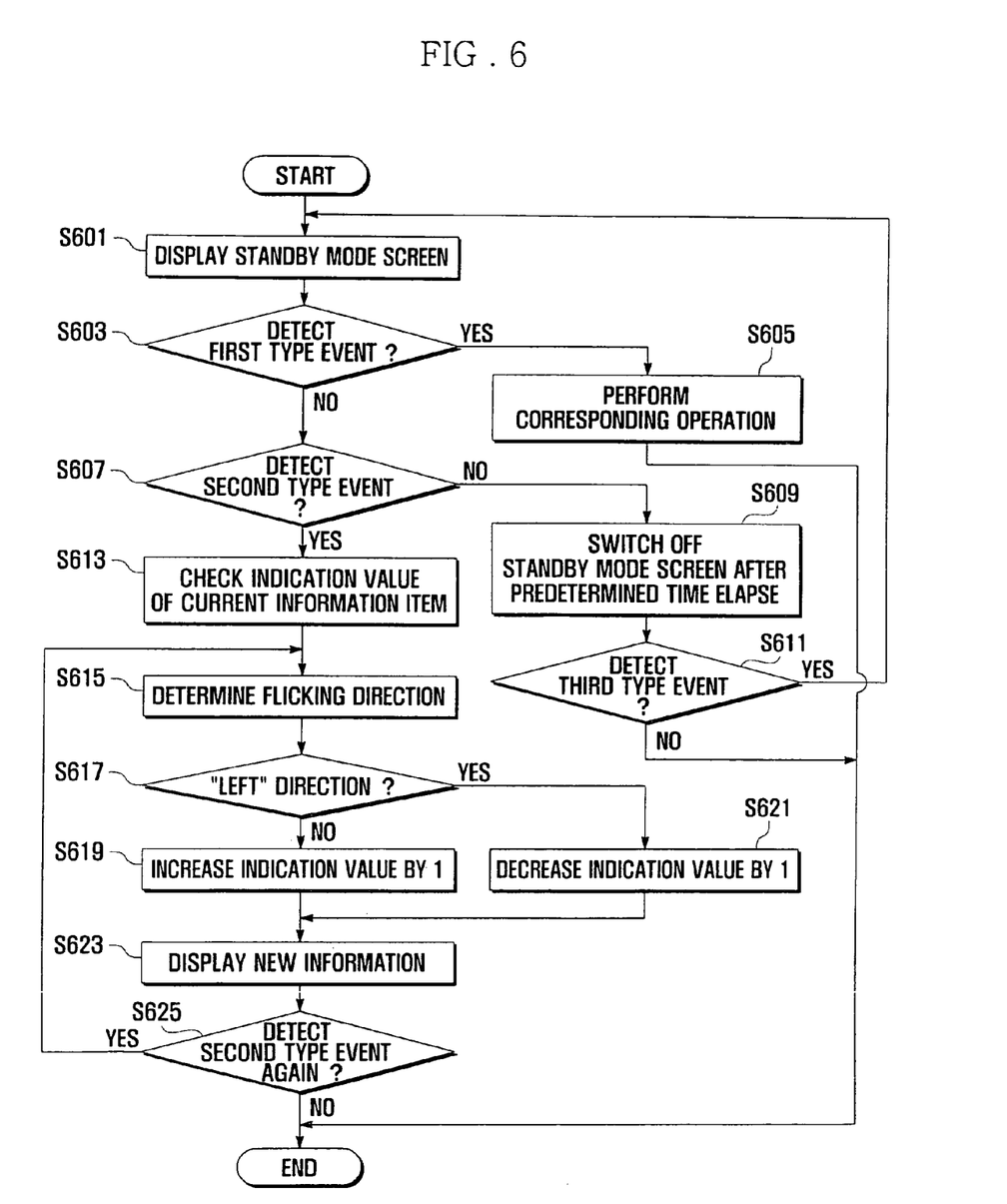
FIG. 6 is a flowchart illustrating a touch event-driven display control method according to an exemplary embodiment of the present invention.

FIG. 6 is a flowchart illustrating a touch event-driven display control method according to an exemplary embodiment of the present invention.

Referring to FIG. 6, once a mobile phone is switched on, the control unit of the mobile phone displays a standby mode screen on the touchscreen while monitoring to detect an event (S601). The events can be classified into first type event (an application enable event) and a second type event (an information change event). The first type event occurs by processing a specific key provided on a keypad and by touching a specific area of the touchscreen. The second type event occurs by flicking a specific area of the touchscreen. The second type event may cause a display information change or moves an object in a specific direction.

If an event is detected, the control unit determines whether the event is the first type event (S603). If the first type event is detected, the control unit performs an operation corresponding to the first type event (S605), i.e. the control unit activates an application matched with the first type event.

If the event is not the first type event, the control unit determines whether the event is the second type event (S607). If it is determined that the event is not the second type event, the control unit turns off the standby mode screen after a predetermined time elapses (S609) and determines whether a third type event is detected (S611). If a third type event is detected, the control unit performs step S601 again or a predetermined operation. The third type event includes the first and second type events.

Returning to step S607, if the event is the second type event, the control unit checks an indication value of the information presented in the information region (S613). The information can be calendar information, first time information, and second time information. The indication values are mapped onto the respective information.

After checking the indication value of the currently presented information, the control unit analyzes the flicking direction of the second type event (S615) and determines whether the flicking direction is left (S617). The flicking direction is determined by comparing the displacements of the flick event in left and right directions.

If the flicking direction is left, the control unit retrieves the information of which indication value is less than that of the currently presented information by 1 (S619). On the other hand, if the flicking direction is right, the control unit retrieves information of which indication value is greater than that of the currently presented information by 1 (S621).

That is, the information to be displayed in response to the flick event is determined by retrieving the information of which indication value is greater than or less than that of the currently presented information by 1 according to the flicking direction. For example, if the indication value of the currently presented information is 2, the next information to be presented by the flick event is the information having an indication value 1 or 3 depending on the flicking direction.

In this embodiment, it is assumed that 3 kinds of information are provided for the information region. In this case, if the indication value of the currently presented information is 3 and the right flick event is detected, the control unit controls to display the information having the indication value 1 since there is no information assigned the indication value 4.

In the same manner, if the indication value of the currently presented information is 1 and the left flick event is detected, the control unit controls to display the information having the indication value 3 since there is no information assigned the indication value 0.

That is, the information to be displayed is determined on the basis of the ordered arrangement of the information rather than the arithmetic increment or decrement of the indication value.

In other words, a number of different kinds of information are arranged in the form of rotating touch wheel such that various kinds of information can be provided through the display screen limited in size. Since the different kinds of information are circularly arranged the lowest and highest indication values are neighbored to be selected as the next information each other. Accordingly, the information is selectively, rotationally displayed in response to the flicking direction.

After retrieving the information to be presented, the control unit control to display the newly retrieved information on the screen (S623). The newly retrieved information has the indication value greater than or less than the currently presented information.

Next, the control unit determines whether the second type event is detected again (S625) and repeats, if the second type event is detected again, step S615.

Although the touch event-driven display control method has been explained above mainly with flick event-based information display procedure, the present invention is not limited thereto. For example, the second type event, i.e. the flick event can be configured to move a position of the information display window. Also, the flick event can be configured to a position or the information display window and change the information within the information display window simultaneously.

Figure 7:
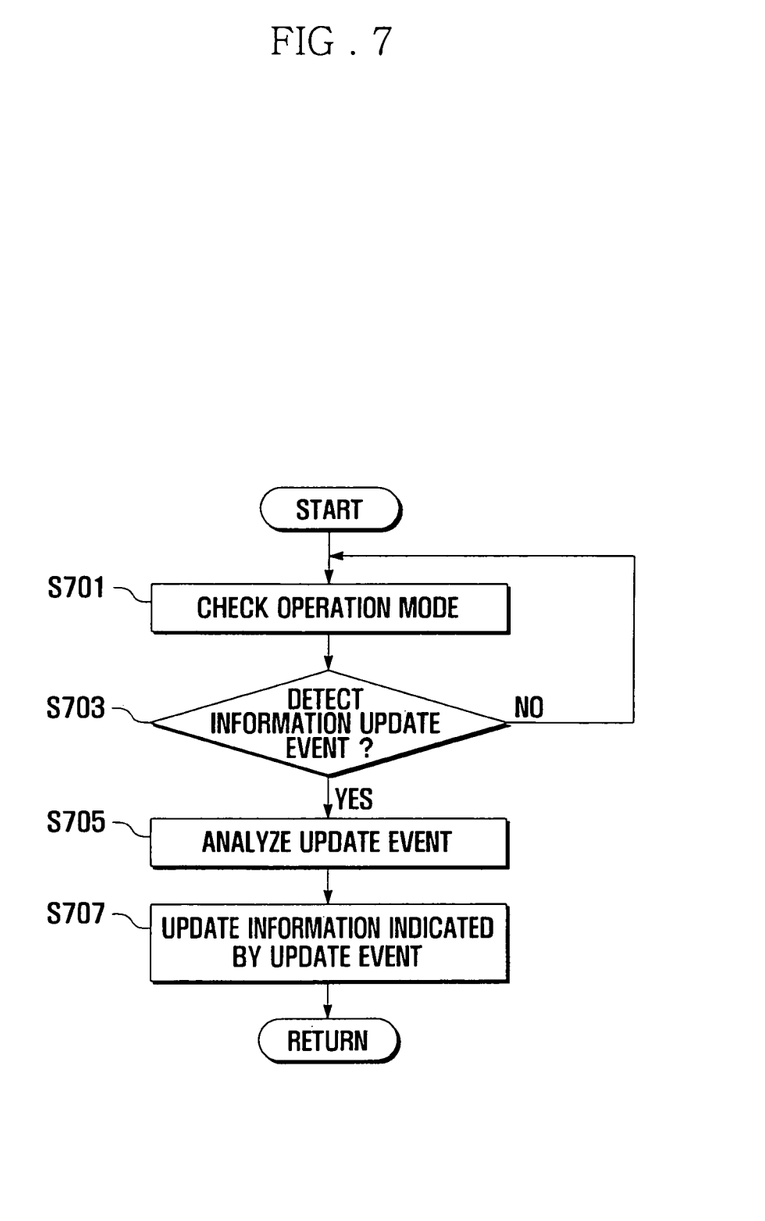
FIG. 7 is a flowchart illustrating an information update procedure of a touch event-driven display control method according to an exemplary embodiment of the present invention.

FIG. 7 is a flowchart illustrating an information update procedure of a touch event-driven display control method according to an exemplary embodiment of the present invention.

The information update is achieved by collecting the information from the source data and displays the collected information in the information region. The source data may be the elements constituting the information.

For example, the calendar as information consists of the elements such as days, dates, schedules, and today marker provided in day view/weekly view/monthly view. The local time information consists of the elements such as time, city, day, and date.

The calendar application updates the calendar such that the day marker moves to next day every 24 hours, and the local time application updates the time every 1 second, 1 minute, 1 hour, and 1 day.

Referring to FIG. 7, the control unit checks the operation mode of the mobile phone (S701). The mobile phone can be provided with various operation modes such as idle mode, application execution mode, standby mode, etc.

Next the control unit monitors to detect an information update event (S703). If an information update event is detected, the control unit analyzes the update event (S705) and performs update on the information indicated by the update event (S707).

The update event is generated by the application associated with the information to be updated. Also, the update event for specific information can be generated more than one application associated with the target information. In this case, the control unit detects the update events generated by the respective applications.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer processor or hardware implement the processing methods described herein.

As described above, the touch event-driven display control system and method of the present invention allows a user to intuitively manipulate the information with touch on a touchscreen, whereby various information elements provided by multiple applications can be legibly presented in a limited size screen.

Also, the touch event-driven display control system and method of the present invention is advantageous to display user-intended application information while displaying a full screen image of another application such as an image viewer and multimedia player, without quitting the ongoing playback.

Furthermore, the touch event-driven display control system and method of the present invention allows a user to move and change information displayed on a touchscreen with various intuitive touch events, resulting in improvement of user convenience.

What is claimed is:

1. An information display method for a touchscreen-enabled device, comprising:
   detecting a touch on an information region of a touchscreen having a plurality of regions;
   determining a type of the touch from at least two or more types of touch, extracting a direction and an indication value of the type of touch, and determining a next information item on the basis of the direction and an indication value of the type of touch, and replacing the information item with the new information item in the information region; and
   processing display of information item according to the type of touch;
   wherein the touchscreen is configured to perform respectively different functions in at least two regions of the plurality of regions of the touchscreen that simultaneously display respective applications and perform respectively different functions in response to a same type of touch event occurring on said at least two regions of the touchscreen, wherein the same type of touch event on a first information window of the touchscreen changes a display of information into another application information, and on a second information window causes a display of the second window to disappear from the touchscreen, and wherein a respective indication value for each type of touch is mapped and checked by a control unit for a current information item, and information to be displayed is determined by the control unit on a basis of an ordered arrangement and not by an arithmetic increment or decrement of the indication value.

2. An information display method for a touchscreen-enabled mobile phone comprising:

displaying a standby mode screen having a plurality of regions including an information region presenting an information item set by a user;

detecting a touch event from at least three different types of touch events on the information region;

extracting a direction and an indication value of the touch;

determining a next information item on the basis of the direction and indication value of the touch event; and replacing the information item with the new information item in the information region;

wherein the touchscreen is configured to perform respectively different functions in at least two regions of the plurality of regions in response to a same type of touch event on different regions of the touchscreen, wherein a respective indication value for each type of touch is mapped and checked by a control unit for a current information item, and information to be displayed is determined by the control unit on a basis of an ordered arrangement and not by an arithmetic increment or decrement of the indication value.

3. The information display method of claim 2, wherein the touch event is a flick event.

4. The information display method of claim 3, further comprising:

determining a direction of the flick event;

moving the information item to a display region of the plurality of regions of the touchscreen when a direction of the flick event is upward or downward; and replacing the information item with another information item depending on the direction when a direction of the flick event is left or right.

5. The information display method of claim 4, further comprising:

detecting a flick event on the information item in the display region; and replacing the information item with another information item in response to a direction of the flick event.

6. An information display method for a touchscreen-based mobile phone, comprising:

displaying a first information item in a first region of a plurality of regions of the touchscreen and an icon representing an application in a second region of the touchscreen;

detecting a touch event on the touchscreen from at least three different types of touch events;

moving and/or changing the first information item depending on a direction of the flick event, when a first-type touch event comprises a flick event on the first information item;

displaying, if a second-type touch event comprises a tap event on the icon, a second information item provided by the application;

wherein a third-type touch event includes both the flick event and the tap event;

wherein a particular type of touch event is configured to perform respectively different functions in at least two regions of the plurality of regions that simultaneously display respective applications and perform respectively different functions in response to a same type of touch event occurring on said at least two regions of the touchscreen wherein the same type of touch event on the first information window of the touchscreen changes a display of information into another application information, and on the second information window causes a display of the second window to disappear from the touchscreen, and wherein a respective indication value for each type of touch event is mapped and checked by a control unit for a current information item, and information to be displayed is determined by the control unit on a basis of an ordered arrangement and not by an arithmetic increment or decrement of the indication value.

7. The information display method of claim 6, wherein displaying a second information comprises:

removing the first information item and presenting the second information item in the first region in response to the tap event.

8. The information display method of claim 7, wherein displaying a second information comprises:

displaying the first information item in a third region and the second information in the first region in response to the tap event.

9. The information display method of claim 8, wherein displaying the second information further comprises:

removing the first information item displayed in the third region after a predetermined time elapses.

10. The information display method of claim 8, wherein the second information item displayed in the third region is moved or replaced by another information item in response to a flick event.

11. The information display method of claim 8, wherein the first region is an information region for presenting the information item, the second region is an indication region for presenting at least one icon representing the application, and the third region is a display region for displaying a background image.

12. The information display method of claim 6, wherein moving and/or changing the first information item comprises:

collecting an information item provided by an application determined by a direction of the flick event; and replacing the information item with the collected information item.

13. The information display method of claim 12, wherein moving and/or changing the first information item further comprises:

moving the first information from the first region to a third region according to an upward or downward direction.

14. The information display method of claim 13, wherein moving and/or changing the first information item further comprises:

detecting a flick event on the first event item of the third region; and replacing the first information item with another information item in response to a direction of the flick event.

15. The information display method of claim 13, wherein moving and/or changing the first information item further comprises disappearing the first information moved to the third region after a predetermined time elapses.

16. The information display method of claim 13, wherein moving and/or changing the first information item further comprises displaying the second information item provided by the application activated by the tap event in the first region.

17. A mobile device comprising:
a display panel for displaying a graphic user interface;
a touchscreen covering the display panel for detecting a touch event from at least two or more types of touch events that occur on the display panel; and
a controller for controlling display of information items on the basis of the touch events;
and wherein the controller is configured to perform different functions in response to a same type of touch event on different areas of the touchscreen that simultaneously display respective applications and perform respectively different functions in response to a same type of touch event occurring on said at least two regions of the touchscreen;
wherein the same type of touch event on a first information window of the touchscreen changes a display of information into another application information, and on a second information window causes a display of the second window to disappear from the touchscreen, and
wherein a respective indication value for each type of touch event is mapped and checked by a control unit for a current information item, and information to be displayed is determined by the control unit on a basis of an ordered arrangement and not by an arithmetic increment or decrement of the indication value.

18. The mobile device of claim 17, wherein the controller comprises:
an event detector for detecting and analyzing the touch events;
an information changer for determining a display position of the information item and changing the information items according to the touch events; and
an information updater for updating the information presented by the information item.

19. The mobile device of claim 18, wherein the touch events are selected from the group consisting of a flick event and a tap event.

20. The mobile device of claim 19, wherein the information changer determines whether the touch event is the flick event a direction of the flick event and the indication value of the information item on which the flick event is detected; and replaces the current information item with another information item of which indication value is ordered before or after the indication value of the current information item among circularly arranged information items according to the direction of the flick event.

21. The mobile device of claim 19, wherein the controller controls the display of a new information item provided by an application activated by a tap event.

22. The mobile device of claim 21, wherein the controller controls to move the current information item to another region of the display panel and display another information item activated by the tap event, in response to the tap event.

23. The mobile device of claim 19, wherein the controller checks information items neighbored with the current information item in a circular manner in response to a flick event and displays one of the neighbored information items according to a direction of the flick event.

24. The mobile device of claim 23, wherein the controller controls to move and replace the information item according to a flick event; and controls to display information item provided by an application activated according to a tab event.

25. The mobile device of claim 17, wherein the touchscreen is laminated on a surface of the display panel.

26. An apparatus for controlling a device including touchscreen, comprising:
a processor in communication with a memory, the memory including software instruction, which when accessed by the processor causes the processor to execute the steps of:
displaying a standby mode screen having an information region presenting an information item set by a user;
detecting a touch event from at least three different types of touch events on the information region;
extracting a direction and an indication value of the touch;
determining a next information item on the basis of the direction and indication value of the touch event; and
replacing the information item with the new information item in the information region;
wherein the touchscreen comprises a plurality of regions including said information region, and the controller is configured to perform different functions in response to a same type of touch event on different regions of the touchscreen;
wherein the same touch event on a first information window of the touchscreen changes a display of information into other application information, and on a second information window causes a display of the second window to disappear from the touchscreen,
wherein a respective indication value for each type of touch is mapped and checked by a control unit for a current information item, and information to be displayed is determined by the control unit on a basis of an ordered arrangement and not by an arithmetic increment or decrement of the indication value.

* * * * *